No. 827,396. PATENTED JULY 31, 1906.
S. G. SCANLAN.
STERILIZER AND PASTEURIZER.
APPLICATION FILED OCT. 30, 1905.
2 SHEETS—SHEET 1.
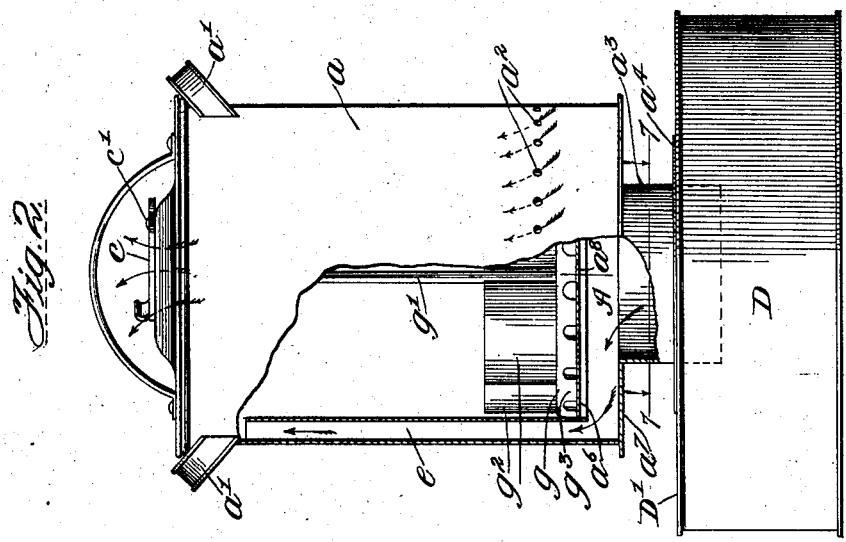
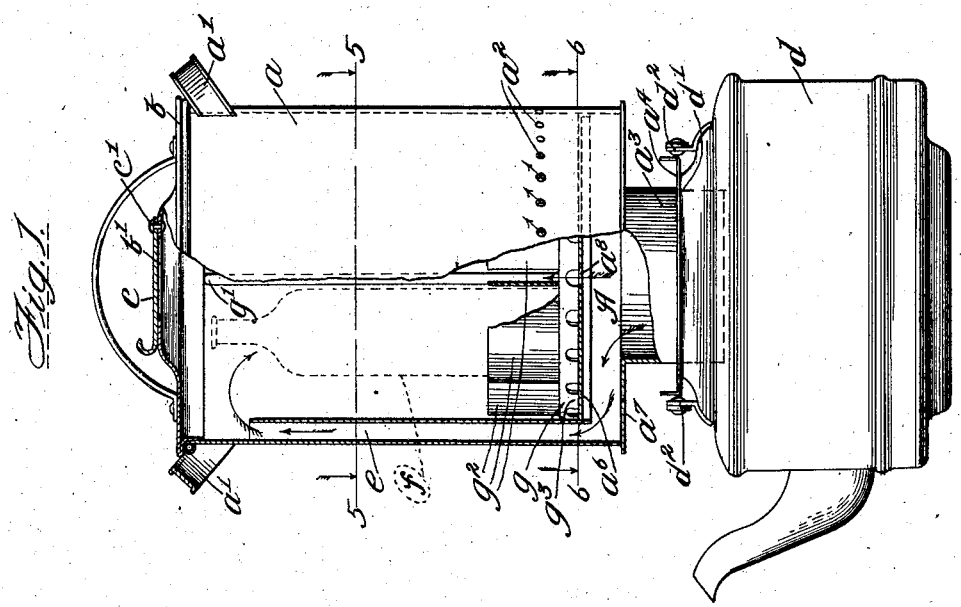
Witnesses:
Inventor:
Sam G. Scanlan
By Cheever & Cox
Attys No. 827,396. PATENTED JULY 31, 1906.
S. G. SCANLAN.
STERILIZER AND PASTEURIZER.
APPLICATION FILED OCT. 30, 1905.

2 SHEETS—SHEET 2.

Witnesses:
Ira D. Perry
Robert H. Weir

Inventor:
Sam G. Scanlan
By Cheever & Cox
Attys.

UNITED STATES PATENT OFFICE.

SAM GWYN SCANLAN, OF MADISON, WISCONSIN.

STERILIZER AND PASTEURIZER.

No. 827,396.　　　Specification of Letters Patent.　　　Patented July 31, 1906.

Application filed October 30, 1905. Serial No. 285,044.

*To all whom it may concern:*

Be it known that I, SAM GWYN SCANLAN, a citizen of the United States, residing at Madison, in the county of Dane and State of Wisconsin, have invented a certain new and useful Improvement in Sterilizers and Pasteurizers, of which the following is a specification.

My invention relates to means for sterilizing or pasteurizing milk and other liquids; and the general object of the invention is to provide an apparatus adapted for domestic use by means of which milk may be sterilized or pasteurized in any desired units of quantity and at any desired temperature.

More especially, the objects of the invention are—

First, to provide a receptacle adapted for use in connection with the ordinary domestic teakettle.

Second, to provide a receptacle so constructed as to afford control of the temperature at which the contents of the receptacle shall be treated. This is accomplished in general by providing vent-apertures in the lower portion of the walls of the outer receptacle and a door at the upper portion of the receptacle for regulating the escape of steam.

Third, to provide means for supplying heat at the bottom and top of the receptacle simultaneously.

Fourth, to provide a bottle-holder whereby the bottles may be lowered simultaneously into the receptacle or be simultaneously withdrawn therefrom.

Fifth, to so construct the bottle-holder that it will act as a spreader for distributing the steam to the different parts of the receptacle.

It is also an object to provide certain improved details, which will be hereinafter more fully set forth.

I obtain these objects by the mechanism illustrated in the accompanying drawings, in which—

Figure 3:
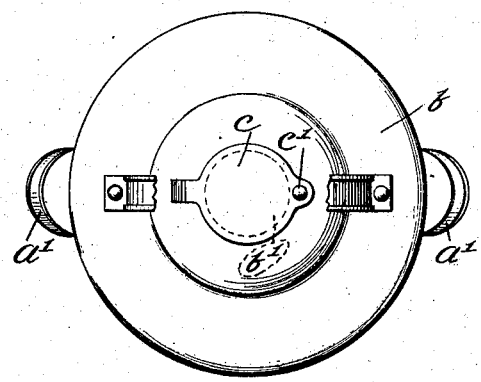
Figure 4:
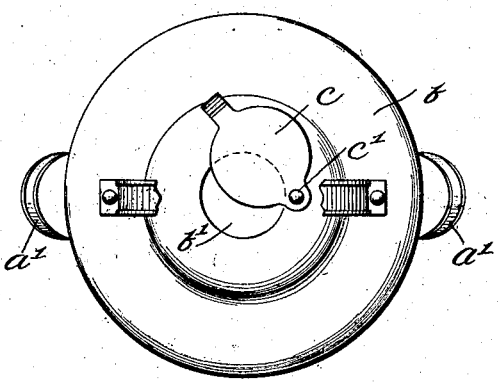
Figure 5:
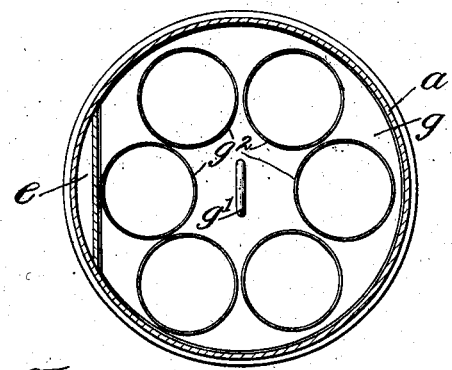
Figure 6:
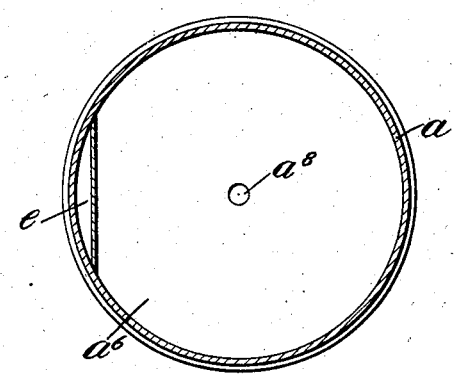
Figure 7:
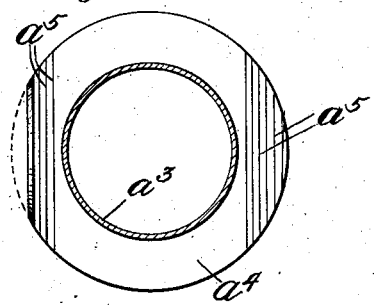
Figure 8:
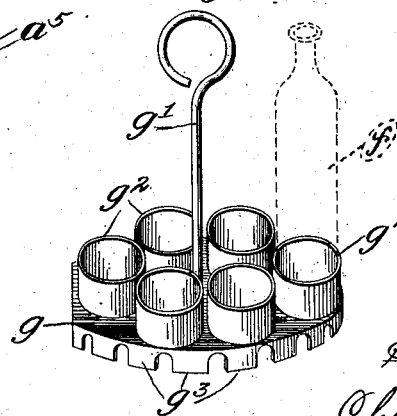

Figure 1 is a side view, partly in section, showing the sterilizer applied to the ordinary domestic tea-kettle. Fig. 2 is similar to Fig. 1, except that the sterilizing-receptacle is shown in position upon a boiler or vaporizer specially constructed for use with the sterilizer. Figs. 3 and 4 are plan views of the sterilizer, showing the top doors in closed and open positions, respectively. Fig. 5 is a plan sectional view taken on line 5 5 of Fig. 1. Fig. 6 is a plan sectional view taken on line 6 6, Fig. 1. Fig. 7 is a plan sectional view taken on line 7 7, Fig. 2; and Fig. 8 is a perspective view of the bottle-holder.

Similar letters refer to similar parts throughout the several views.

The outer receptacle $a$, which constitutes the body of the apparatus, is preferably cylindrical in form and provided with ears or handles $a'$, whereby it may be transported. Said receptacle is provided with a cover $b$, which makes, preferably, air-tight connection therewith and has an aperture $b'$ therein. At said aperture a door or cover $c$ is so located as to control the escape of steam or hot vapor from the receptacle. In the preferred construction said door is pivoted to the cover $b$ at the point $c'$, located at the side of said aperture, and as a result of this construction the effectual opening through the aperture $b'$ may be regulated by varying the position of said door about its pivot.

In the sides of the receptacle $a$ at a point near the bottom thereof is arranged a series of vent-apertures $a^2$, through which steam or vapor may pass into and out of the receptacle in the manner hereinafter described.

Extending downward from the body of the receptacle $a$ is a cylindrical portion $a^3$, which is of such diameter as to be readily received within the top opening $d'$ of a boiler $d$. In Fig. 1 this boiler is shown to consist of an ordinary domestic tea-kettle, and by making the diameter of said portion $a^3$ equal to about two and one-half inches I find that it will enter all ordinary boilers of this kind.

To adapt my improved apparatus to boilers of larger sizes, I provide an annular flange $a^4$ upon the extension $a^3$ at a point between the upper and lower extremity thereof, which flange extends beyond the rim of the kettle-opening $d'$ and permits the receptacle to rest upon the tea-kettle. By thus placing said flange intermediate of the extremities of extension $a^3$ a portion of said extension is permitted to enter into the kettle itself, and thereby tend to keep the receptacle centered with respect to the kettle, and the lower extremity of the receptacle-body is held in a position sufficiently elevated to clear the bail-ears $d^2$ of the kettle. In order that the bail-ears $d^2$ may not interfere with said bail-flange $a^4$, it is sometimes necessary to turn up a portion of the flange adjacent to the ears, as illustrated in Figs. 1, 5, 6, and 7. By thus turning up a portion of the flange the flange acts as a centering-piece to prevent lateral movement of the receptacle upon the kettle. In order to facilitate the upturning of a portion of the flange $a^4$, it is sometimes desirable to score or indent said flange in parallel lines in the manner shown at $a^5$, Fig. 7.

Water-boilers other than tea-kettles may be employed, however, and in Fig. 2 is shown a boiler D, which consists merely of a vessel having a top D' for supporting the flange $a^4$, said top being apertured for receiving the lower extremity of cylindrical portion $a^3$ of receptacle $a$. Said cylindrical portion $a^3$ connects with the interior of receptacle $a$ at the lower portion thereof, and in the present preferred design there is a false or inner bottom $a^6$, located within the vessel a slight distance above the outer bottom $a^7$, thereby forming a chamber A between them. This false or inner bottom $a^6$ extends across and is coextensive with receptacle $a$ except at one side, where there is a duct $e$, leading from the chamber A to a point near the top of the interior of said receptacle. Duct $e$ is not positively essential to the operation of the apparatus, nor is it essential that one duct only should be employed; but such ducts (or one of them) are advantageous in that means is thereby afforded for conveying steam immediately to the top of the receptacle from the boiler, and thereby convey vapor to the top of the receptacle at as high a temperature as the vapor entering the bottom of the receptacle.

It is desirable that the plate $a^6$ be imperforate except at its center, where there is located an aperture $a^8$, through which steam may enter directly into the lower portion of receptacle $a$.

The purpose for which this apparatus is primarily intended is the sterilization or pasteurization of milk, which under ordinary circumstances will be contained within bottles $f$. (Indicated in dotted lines, Fig. 1, and in dotted lines, Fig. 8.) For raising and lowering the bottles into and out of the receptacle $a$ a holder is provided, which in its best form consists of the platform $g$, having a handle $g'$ and a set of cups or sockets $g^2$ for receiving the bottles and holding them securely in position upon the holder.

In order that a passage may be afforded for the steam entering through aperture $a^8$, platform $g$ does not rest directly upon the inner bottom $a^6$, but is elevated a slight distance therefrom, preferably by means of the legs $g^3$, formed upon the platform $g$. The dimensions of platform $g$ are smaller than the cross-sectional dimensions of receptacle $a$, and consequently there is afforded a passage for steam around the outer edge of said platform, so that steam entering aperture $a^8$ is spread by means of platform $g$ and permitted to pass through the space between the legs $g^3$ and up and through the space between the periphery of platform $g$ and the inner surface of receptacle $a$. In the preferred design here shown platform $g$ is constructed of a single piece of sheet metal, with the legs formed by blanking out the same and subsequently turning them down at right angles in the manner best shown in Figs. 1, 2, and 8.

In operation the bottle-holder with the bottles therein is lowered into receptacle $a$, the cover $b$ is adjusted, and the receptacle $a$ is placed upon a kettle $d$ or special boiler D, as the case may be. In the case of the kettle if the apparatus is being used for the first time and the edges of flange $a^4$ interfere with the bail-ears $d^2$ a necessary portion of said flange is bent upward to permit the remaining portion of the flange to come down and rest fairly upon the top of the kettle. When heat is applied to the boilers $d$ or D, the steam which is generated passes off through the cylindrical portion $a^3$ and enters chamber A in the lower portion of the receptacle. Part of the steam thus entering will pass up through duct $e$ to the top of the receptacle, where it will heat the upper portions of the bottles $f$. Another part of the steam will pass up through aperture $a^8$ in the inner or false bottom $a^6$ and will be spread by the platform $g$ of the bottle-holder to the periphery of the receptacle. The steam will thence pass off around the edges of said platform and enter the bottom of the receptacle where the bottles are contained. The temperature at which treatment will take place will now depend upon the position of door $c$. As steam leaves the boiler $d$ or D it will of course be at or near 212° Fahrenheit, it having little opportunity to lose heat before entering receptacle $a$ and, on the other hand, having no tendency to acquire a greater temperature than that of boiling water, for the reason that the steam will at no time attain a pressure much if any higher than that of the surrounding atmosphere. It may be said, therefore, that under ordinary circumstances the steam or vapor entering receptacle $a$ will be approximately 212°. It is well known, however, to those skilled in such matters that milk subjected to a temperature of 212° for any considerable period becomes to a certain extent unfit for the use of young infants. For infants' use it is preferable that the milk be not raised above a temperature ranging from 150° to 175° Fahrenheit. When treated at this temperature, milk will be rendered safe for the use of infants without being cooked or changing its food qualities in any way so as to be harmful. This treatment, which is frequently known as "pasteurizing," may be accomplished by the use of this apparatus by throwing door $c$ to open position. By this means steam or water-vapor at nearly the temperature of steam passes quickly out of receptacle $a$, the time of contact with the milk-bottles being thereby reduced and in addition the upward draft produced by the passage of the steam causing outside air to be drawn into receptacle $a$ through the apertures $a^2$ therein. Thus by opening the door $c$ wide the time of contact of the steam with the bottles is reduced, and also the temperature of the gas within the receptacle is reduced by reason of the admixture of the cooled outside air. If, however, it is desired to subject the milk to a temperature of 205° or thereabout, at which temperature it will become more thoroughly sterilized without suffering the deteriorating effects of boiling, the cover $c$ is closed and the steam instead of escaping rapidly into the atmosphere is retained within the receptacle until the same is filled with steam and the latter is finally forced outward through the apertures $a^2$, which in the case of a closed boiler D acts somewhat in the nature of a safety-valve to prevent the accumulation of steam-pressure within the receptacle. By keeping the door $c$ tightly shut the temperature within may be maintained at 110°, and by varying the position of the door the temperature may be regulated to any desired point below that of boiling water. When the milk has been treated for a sufficient length of time, the cover $b$ may be removed and the bottle-holder $g$ with the bottles therein may be removed by simply lifting them out with the assistance of handle $g'$. By the use of a bottle-holder of this type fresh bottles may, if desired, be introduced into the receptacle for treatment without removing the receptacle from the boiler, or the bottles may be laid away to cool without removing them from the bottle-holder. By providing a bottle-holder adapted to receive, for example, six bottles there may be treated at a single time enough milk for use at six different times without the necessity of uncorking any of the bottles, except the one to be used, which uncorking would subject the contents of the bottle to bacteria which might be in suspension in the air.

What I claim as new, and desire to secure by Letters Patent, is—

1. In a sterilizer the combination of a covered receptacle, means for supplying steam to the bottom thereof, means for regulating the escape of steam at the top, and a lateral vent in the lower portion of said receptacle, above the steam-supplying means.

2. In a sterilizer the combination of a covered receptacle, a liquid-containing vessel adapted to be loosely received therein, means for supplying steam to the bottom of the vessel, means in the upper portion of said receptacle for regulating the escape of steam, and a series of apertures distributed around the sides of the receptacle in the lower portion thereof.

3. In a sterilizer the combination of a covered receptacle, a liquid-containing vessel adapted to be loosely received therein, means for supplying steam to the bottom of the vessel, means in the upper portion of said receptacle for regulating the escape of steam, said receptacle having a series of apertures distributed around the sides thereof in the lower portion thereof, and a duct leading from the steam-supply to a point within said receptacle near the top thereof.

4. In a sterilizer the combination of a covered receptacle, a liquid-containing vessel adapted to be loosely received therein, means for supplying steam to the bottom of the vessel, means in the upper portion of said receptacle for regulating the escape of steam, said receptacle having a series of apertures distributed around the sides thereof in the lower portion thereof, bottles, and a bottle-holder comprising a platform and handle affixed thereto, said platform being almost coextensive with the receptacle-bottom and located beneath said series of apertures in said receptacle whereby the incoming air enters above said holder-platform.

5. In a sterilizer the combination of a covered receptacle, having an aperture approximately in the middle of its bottom for receiving the steam, means for supplying steam to said aperture in the bottom of the receptacle, bottles, a bottle-holder comprising a platform and handle affixed thereto, said platform being almost coextensive with the receptacle-bottom but leaving a space between its edges and the receptacle sides and said platform being slightly raised from the receptacle-bottom, whereby said holder-platform acts as a distributer for the entering steam, and means at the top of the said covered receptacle for regulating the escape of steam, said receptacle having a series of apertures distributed around its sides in the lower portion thereof for admitting cooling air thereinto from the outside.

6. A sterilizer consisting of a covered receptacle having an aperture in the bottom through which sterilizing-vapor may enter, said receptacle having apertures distributed circumferentially in its sides near the bottom thereof; and said receptacle having an escape-aperture in the top, and a door for said escape-aperture for controlling the escape of steam.

In witness whereof I have hereunto subscribed my name in the presence of two witnesses.

SAM GWYN SCANLAN.

Witnesses:
ALFRED LITTAUER,
HOWARD M. COX.